United States Patent
Kim et al.

(10) Patent No.: US 8,515,443 B2
(45) Date of Patent: Aug. 20, 2013

(54) APPARATUS AND METHOD FOR TRANSMITTING/RECEIVING CHANNEL QUALITY INFORMATION IN A COMMUNICATION SYSTEM

(75) Inventors: Dai-Kwan Kim, Seoul (KR); Young-Hyun Jeon, Guri-si (KR); Jong-Hyung Kwun, Seongnam-si (KR); Woong-Sup Lee, Daejeon (KR); Dong-Ho Cho, Seoul (KR); Chul-Kee Hong, Hwaseong-si (KR); Hyu-Dae Kim, Daejeon (KR); Ju-Yeop Kim, Anyang-si (KR); Hun-Joo Lee, Daegu (KR); Sik Choi, Daejeon (KR); Ho-Won Lee, Chungju-si (KR); Se-Young Yun, Jecheon-si (KR)

(73) Assignees: Samsung Electronics Co., Ltd., Suwon-Si (KR); Korea Advanced Institute of Science and Technology, Deajeon (KR)

( * ) Notice: Subject to any disclaimer, the term of this patent is extended or adjusted under 35 U.S.C. 154(b) by 1501 days.

(21) Appl. No.: 12/054,112

(22) Filed: Mar. 24, 2008

(65) Prior Publication Data
US 2008/0233989 A1 Sep. 25, 2008

(30) Foreign Application Priority Data
Mar. 23, 2007 (KR) .................. 10-2007-0028908

(51) Int. Cl.
*H04W 72/00* (2009.01)
(52) U.S. Cl.
USPC ........... 455/452.2; 455/436; 455/7; 455/11.1; 455/13.1; 455/16; 370/312; 370/329; 375/260

(58) Field of Classification Search
USPC .................. 455/7, 11.1, 13.1, 16, 436, 452.2; 370/312, 329; 375/260
See application file for complete search history.

(56) References Cited

U.S. PATENT DOCUMENTS

| | | | |
|---|---|---|---|
| 6,360,076 B1 | 3/2002 | Segura et al. | |
| 6,606,482 B1 * | 8/2003 | Wheeler | 455/11.1 |
| 7,606,182 B2 * | 10/2009 | Park et al. | 370/279 |
| 7,813,746 B2 * | 10/2010 | Rajkotia | 455/515 |
| 2003/0125067 A1 * | 7/2003 | Takeda et al. | 455/522 |
| 2005/0014464 A1 * | 1/2005 | Larsson | 455/11.1 |
| 2005/0053025 A1 * | 3/2005 | Duffy et al. | 370/315 |
| 2006/0153132 A1 * | 7/2006 | Saito | 370/329 |
| 2006/0270341 A1 * | 11/2006 | Kim et al. | 455/16 |
| 2007/0249347 A1 * | 10/2007 | Saifullah et al. | 455/436 |
| 2008/0125136 A1 * | 5/2008 | Song et al. | 455/452.1 |
| 2008/0247478 A1 * | 10/2008 | Lee et al. | 375/260 |
| 2009/0047898 A1 * | 2/2009 | Imamura et al. | 455/7 |
| 2009/0285145 A1 * | 11/2009 | Youn et al. | 370/312 |
| 2010/0240388 A1 * | 9/2010 | Nakatsugawa | 455/452.2 |

* cited by examiner

*Primary Examiner* — April G Gonzales
(74) *Attorney, Agent, or Firm* — Jefferson IP Law, LLP

(57) ABSTRACT

An apparatus and method for transmitting/receiving a Channel Quality Information (CQI) in a communication system are provided. A Mobile Station (MS) receives first information indicating a representative MS selected from a group of MSs located within a preset range and in similar channel statuses, the group including the MS, determines from the first information whether the MS is designated as the representative MS, and transmits a CQI of the MS as a representative CQI of the MSs included in the group to a Base Station (BS), if the MS is designated as the representative MS.

52 Claims, 12 Drawing Sheets

| GROUP MS NUMBER (302) | GROUP MS INFORMATION (304) | CQI FEEDBACK TRANSMISSION RESOURCE INFORMATION (306) | CQI FEEDBACK TRANSMISSION PERIOD INFORMATION (308) |

| REPRESENTATIVE MS INFORMATION (902) | CQI FEEDBACK TRANSMISSION RESOURCE INFORMATION (904) | CQI FEEDBACK TRANSMISSION PERIOD INFORMATION (906) |
|---|---|---|

APPARATUS AND METHOD FOR TRANSMITTING/RECEIVING CHANNEL QUALITY INFORMATION IN A COMMUNICATION SYSTEM

PRIORITY

This application claims the benefit under 35 U.S.C. §119 (a) of a Korean patent application filed in the Korean Intellectual Property Office on Mar. 23, 2007 and assigned Serial No. 2007-28908, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd. and the Korea Advanced Institute of Science and Technology.

BACKGROUND OF THE INVENTION

1. Field of the Invention

The present invention relates to a communication system. More particularly, the present invention relates to an apparatus and method for transmitting/receiving Channel Quality Information (CQI) in a communication system.

2. Description of the Related Art

The development trend of communication systems is toward providing high-speed large-capacity data services to Mobile Stations (MSs). To provide high-speed large-capacity data services, communication systems require higher data throughputs and thus use adaptive transmission schemes.

When using adaptive transmission schemes, a Base Station (BS) determines coding and modulation schemes for data to be transmitted to an MS according to the channel quality between the BS and the MS. A prevalent channel adaptive transmission scheme is Adaptive Modulation and Coding (AMC). When using AMC, a BS adaptively selects Modulation and Coding Scheme (MCS) levels for data to be transmitted to MSs according to the channel qualities between the BS and the MSs. For the selection of an adaptive MCS level, the BS should have knowledge of the channel qualities of the MSs. Hence, the MSs feed back CQIs representing the channel qualities and the BS determines MCS levels for the MSs based on the CQIs. The CQIs can be Signal-to-Interference and Noise Ratios (SINRs) or MCS level values, for example.

There are two types of CQI feedback, namely average CQI feedback and band CQI feedback. An MS transmits the average CQI of subchannels allocated to it in the former feedback scheme, whereas the MS transmits the CQIs of respective subchannels allocated to it in the latter feedback scheme. That is, the MS feeds back slow fading information about an allocated channel in the average CQI feedback scheme, and it feeds back fast fading information about the allocated channel in the band CQI feedback scheme. As described above, since the MS feeds back one average CQI regarding the allocated subchannels to the BS, the average CQI feedback has reduced CQI feedback overhead, compared to the band CQI feedback. Accordingly, it is preferable to use the average CQI feedback, when overhead in the system is an issue.

Despite the use of the average CQI feedback scheme, however, the CQI feedback overhead increases with the number of MSs serviced in the communication system. Moreover, there is inevitable overhead as the MSs each consume power to feedback their CQIs. Accordingly, there exists a need for a technique for reducing overhead such as CQI feedback-caused power consumption on the part of an MS, while reducing CQI feedback overhead on the part of a communication system.

SUMMARY OF THE INVENTION

An aspect of the present invention is to address at least the problems and/or disadvantages and to provide at least the advantages described below. Accordingly, an aspect of the present invention is to provide an apparatus and method for reducing CQI feedback overhead in a communication system.

Another aspect of the present invention is to provide an apparatus and method for reducing the power consumption of CQI feedback in an MS.

In accordance with an aspect of exemplary embodiments of the present invention, a CQI transmission method of an MS in a communication system is provided. The method includes, in which first information is received, which indicates a representative MS selected from a group of MSs located within a preset range and in similar channel statuses, including the MS, it is determined from the first information whether the MS is designated as the representative MS, and a CQI of the MS is transmitted to a BS as a representative CQI of the MSs included in the group, if the MS is designated as the representative MS.

In accordance with another aspect of exemplary embodiments of the present invention, a CQI reception method of a BS in a communication system is provided. The method includes, in which at least one group is generated by grouping MSs located within a preset range and in similar channel statuses into the same group, a representative MS that will transmit a CQI is selected from the group, first information indicating the representative MS is generated, the first information is transmitted to the MSs included in the group, and a CQI of the representative MS is received from the representative MS in response to the first information.

In accordance with a further aspect of exemplary embodiments of the present invention, a CQI transmission apparatus in a communication system is provided. The apparatus includes, in which an MS receives first information indicating a representative MS selected from a group of MSs located within a preset range and in similar channel statuses, the MS belonging to the group, determines from the first information whether the MS is designated as the representative MS, and transmits a CQI of the MS as a representative CQI of the MSs included in the group to a BS, if the MS is designated as the representative MS.

In accordance with still another aspect of exemplary embodiments of the present invention, a CQI reception apparatus in a communication system is provided. The apparatus includes, in which a BS generates at least one group by grouping MSs located within a preset range and in similar channel statuses into the same group, selects a representative MS that will transmit a CQI from the group, generates first information indicating the representative MS, transmits the first information to the MSs included in the group, and receives a CQI of the representative MS from the representative MS in response to the first information.

In accordance with yet aspect of exemplary embodiments of the present invention, a CQI transmission method of a Mobile Relay Station (MRS) in a communication system is provided. The method includes receiving first information requesting the MRS to transmit a CQI as a representative CQI of a group of MSs located within a preset range and in similar channel statuses among MSs within a cell, and transmitting the CQI of the MRS as the representative CQI of the MSs included in the group to a BS in response to the first information.

In accordance with another aspect of exemplary embodiments of the present invention, a CQI reception method of a BS in a communication system is provided. The method includes generating at least one group by grouping MSs located within a preset range and in similar channel statuses into the same group among MSs within a cell, generating first information requesting transmission of a representative CQI of the group, transmitting the first information to a MRS, and receiving a CQI of the MRS as the representative CQI of the MSs included in the group in response to the first information.

In accordance with a further aspect of exemplary embodiments of the present invention, a CQI transmission apparatus in a communication system is provided. The apparatus includes a MRS for receiving first information requesting the MRS to transmit a CQI as a representative CQI of a group of MSs located within a preset range and in similar channel statuses among MSs within a cell of the MRS, and for transmitting the CQI of the MRS as the representative CQI of the MSs included in the group to a BS in response to the first information.

In accordance with still another aspect of exemplary embodiments of the present invention, a CQI reception apparatus in a communication system is provided. The apparatus includes a BS for generating at least one group by grouping MSs located within a preset range and in similar channel statuses into the same group among MSs within a cell, generating first information requesting transmission of a representative CQI of the group, transmitting the first information to a MRS; and receiving a CQI of the MRS as the representative CQI of the MSs included in the group in response to the first information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 3 illustrates the structure of a group_CQI-fair message transmitted from a BS in a communication system according to an exemplary embodiment of the present invention;

FIG. 9 illustrates the structure of a group_CQI-non-fair message transmitted from a BS in a communication system according to an exemplary embodiment of the present invention;

Throughout the drawings, the same drawing reference numerals will be understood to refer to the same elements, features and structures.

DETAILED DESCRIPTION OF EXEMPLARY EMBODIMENTS

Figure 1:
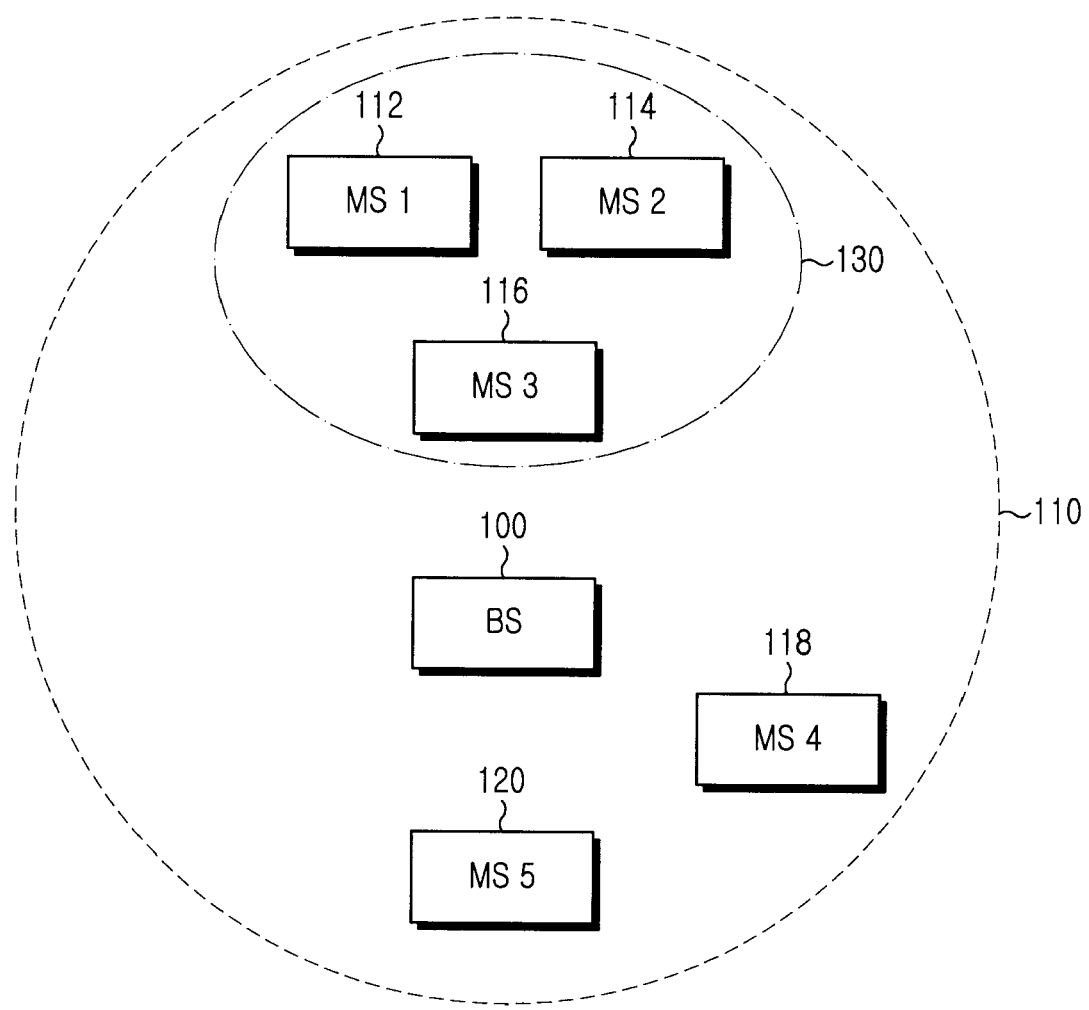
FIG. 1 illustrates the configuration of a communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are intended to provide an apparatus and method for grouping Mobile Stations (MSs) according to their channel statuses so that MSs in similar channel statuses belong to the same group and transmit/receive Channel Quality Information (CQI) on a group basis by an average CQI feedback scheme in a communication system. While the CQI transmission/reception apparatus and method of exemplary embodiments of the present invention are applicable to any communication system, the following description is made in the context of an Orthogonal Frequency Division Multiple Access (OFDMA) system, by way of example.

Average CQI feedback is a feedback scheme in which an MS transmits the average CQI of subchannels allocated to it, that is, slow fading information about its channel. Before describing an average CQI feedback scheme according to exemplary embodiments of the present invention, propagation factors of a radio channel will first be described.

The propagation factors of a radio channel can be classified into three categories: path loss, shadow fading, and multi-path fading. These propagation factors have their own operational ranges and variations. The operational range of a propagation factor is a coherence distance that is the distance between points for which the propagation factor is uncorrelated with other propagation factors. On the assumption that each propagation factor is a random variable, the variation of the propagation factor is the variance of the propagation factor.

Path loss has the widest operational range, followed by shadow fading and then multi-path fading. The variation of path loss can be assumed to be a constant, not a random variable. That is, the path loss variation between a Base Station (BS) and an MS is proportional to the distance between them. Shadow fading has a variation of 6 to 10 dB and multi-path fading has a variation of 20 to 30 dB.

Both pass loss and shadow fading are referred to as slow fading, and multi-path fading is referred to as fast fading. In the average CQI feedback scheme, the MS feeds back an average CQI of its allocated subchannels to the BS and the average CQI only has the slow fading components of the subchannels with their fast fading components eliminated by averaging.

Slow fading has a spatial correlation property. Since one slow fading component, namely path loss, increases with the distance between the BS and the MS, MSs located at similar positions experience similar path losses. The other fading component, shadow fading, also has spatial correlation. Consequently, as slow fading channels are spatially correlated, MSs separated from the BS by similar distances have similar slow fading characteristics.

In a communication system using the average CQI feedback scheme, MSs that are located within a certain range and have a substantially equal velocity are similar in channel status and thus in slow fading characteristics. These MSs will feed back almost the same average CQI to the BS and the BS will select almost the same MCS level for them based on the average CQI.

Therefore, the BS groups all MSs such that MSs in similar channel statuses within a preset range belong to the same group in exemplary embodiments of the present invention. The individual MSs of each group do not feed back their average CQIs. Rather, a representative MS of the group transmits an average CQI to the BS. The BS then determines an MCS level for each group based on the group-based average CQIs and encodes and modulates data directed to the MSs of the group at the MCS level, prior to data transmission to the MSs.

Exemplary embodiments of the present invention will be described separately in the context of a single-hop communication network and in the context of a multi-hop communication network using Mobile Relay Stations (MRSs). An MS of a group that is designated to transmit an average CQI is referred to as a representative MS of the group and the other MSs of the group are referred to as neighbor MSs.

FIG. 1 illustrates the configuration of a communication system having a single-hop communication network according to an exemplary embodiment of the present invention.

Referring to FIG. 1, the communication system includes a cell 110, a BS 100 for managing the cell 110, and first to fifth MSs 112, 114, 116, 118 and 120 (MS 1 to MS 5) within the cell 110.

If MS 1, MS 2 and MS 3 are located within a preset range and placed in similar channel statuses, the BS 100 can group MS 1, MS 2 and MS 3 into a group 130 and designate one of MS 1, MS 2 and MS 3 as a representative MS. The representative MS feeds back an average CQI to the BS 100. The BS 100 selects an MCS level by analyzing the average CQI and encodes and modulates data to be transmitted to the MSs of the group 130 according to the MCS level, prior to transmission.

Average CQI feedback schemes are categorized into fair average CQI feedback and non-fair average CQI feedback depending on the way the BS 100 designates a representative MS. In the fair average CQI feedback scheme, the BS 100 designates the MSs of the group as the representative MS sequentially in a preset order and the representative MS feeds back an average CQI. Meanwhile, the BS designates a particular one of the MSs belonging to the group as the representative MS and only that particular MS continuously feeds back an average CQI as the representative MS.

Figure 2:
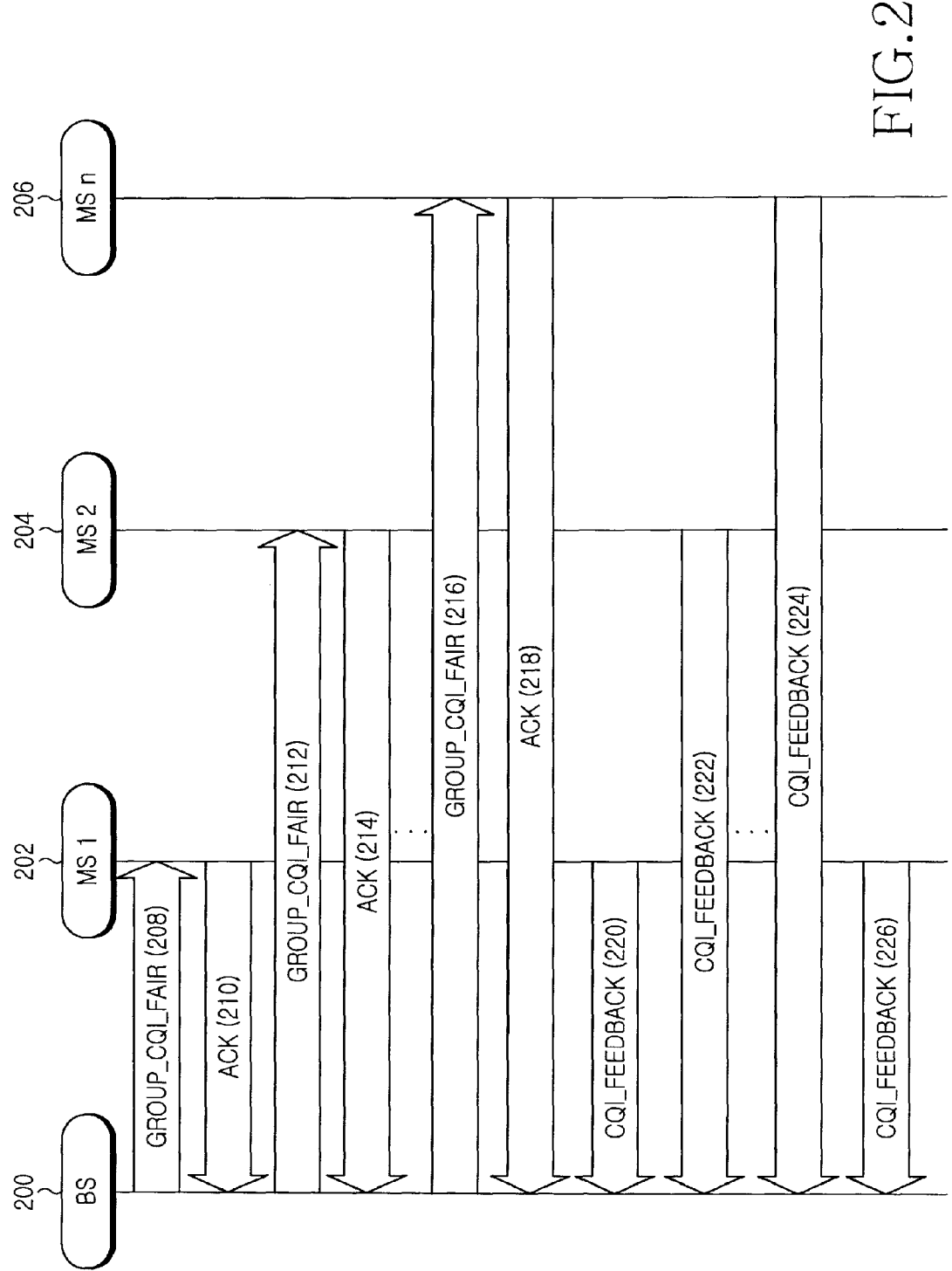
FIG. 2 is a diagram illustrating a signal flow for an operation for receiving average Channel Quality Information (CQI) from Mobile Stations (MSs) in a preset order in a Base Station (BS) in a communication system according to an exemplary embodiment of the present invention.

FIG. 2 is a diagram illustrating a signal flow for a fair average CQI feed back operation in a communication system according to an exemplary embodiment of the present invention.

According to the fair average CQI feedback scheme described above, the BS designates the MSs of a group sequentially as a representative MS and the representative MS feeds back an average CQI to the BS. The sequential representative MS designation advantageously distributes CQI feedback-caused power consumption among the MSs.

For notational simplicity, it is assumed that the BS groups n MSs into the same group. A BS 200 detects MSs located within a preset range and in similar channel statuses among all MSs within the cell of the BS and groups them.

The BS 200 calculates the SINR difference between the MSs and determines that the MSs are in similar channel statuses if the SINR difference is equal to or less than a preset threshold value.

The BS 200 transmits a group_CQI_fair message to a first MS 202 (MS 1) of the group in step 208.

The structure of the group_CQI_fair message is illustrated in FIG. 3. Referring to FIG. 3, a group_CQI_fair message 300 includes information about the number of MSs in the group (group MS number) 302, information about each of the MSs in the group (group MS information) 304, information indicating a position in a frame at which a representative MS will feed back an average CQI (CQI feedback transmission resource information) 306, and information indicating a transmission period in which the MSs will transmit average CQIs (CQI feedback transmission period information) 308. The group MS information 304 can be information about the indexes of the MSs by which the MSs are identified.

Upon receipt of the group_CQI_fair message, MS 1 transmits an ACKnowledge (ACK) message indicating successful reception of the group_CQI_fair message to the BS 200 in step 210.

In step 212, the BS 200 transmits the group_CQI_fair message to a second MS 204 (MS 2) of the group. In response, MS 2 transmits an ACK message to the BS 200 in step 214.

In step 216, the BS 200 transmits the group_CQI_fair message to an n$^{th}$ MS 206 (MS n) of the group. In response, MS n transmits an ACK message to the BS 200 in step 218.

Steps 208 through 218 exemplify transmission of the group_CQI_fair message from the BS 200 to the individual MSs of the group and transmission of the ACK messages from the MSs to the BS 200. These steps are referred to as a fair average CQI feedback initialization.

If the BS 200 fails to receive an ACK message from any MS of the group, it can retransmit the group_CQI_fair message to the MS.

Each MS can determine when it will be designated as a representative MS based on the group MS number 302, the group MS information 304, and the CQI feedback transmission period information 308 set in the group_CQI_fair message. For example, an MS corresponding to a first MS index feeds back an average CQI and then an MS corresponding to a second MS index feeds back an average CQI. After an MS corresponding to a last MS index feeds back an average CQI, the MS corresponding to the first MS index feeds back an average CQI.

If MS 1 is designated as the representative MS, it averages the CQIs of subchannels allocated to it, generates a CQI_feedback message including the average CQI, and transmits the CQI_feedback message to the BS 200 in resources indicated by the CQI feedback transmission resource information 306 in step 220.

If MS 2 is designated as the representative MS, it averages the CQIs of subchannels allocated to it, generates a CQI_feedback message including the average CQI, and transmits the CQI_feedback message to the BS 200 in resources indicated by the CQI feedback transmission resource information 306 in step 222.

If MS n is designated as the representative MS, it averages the CQIs of subchannels allocated to it, generates a CQI_feedback message including the average CQI, and transmits the CQI_feedback message to the BS 200 in resources indicated by the CQI feedback transmission resource information 306 in step 224.

If MS 1 is again designated as the representative MS, it averages the CQIs of subchannels allocated to it, generates a CQI_feedback message including the average CQI, and transmits the CQI_feedback message to the BS 200 in resources indicated by the CQI feedback transmission resource information 306 in step 226.

Steps 220 through 226 exemplify transmission of the CQI_feedback message from the representative MSs to the BS 200. The MSs of the group are sequentially designated as the representative MS in a preset order and the representative MS generates and transmits a CQI_feedback message to the BS 200.

Then, the BS selects an MCS level based on the average CQI received from the representative MS, encodes and modulates data directed to the MSs of the group using the MCS level, and transmits the coded and modulated data to the MSs.

The simple application of the MCS level selected based on the average CQI of the representative MS to the MSs of the group offers the benefit of decreasing the data rates of all of the channels.

However, the neighbor MSs of the group may require a different MCS level from the selected MCS level based on the average CQI of the representative MS. Hence, the communication system needs CQI feedback error correction so that the neighbor MSs can set different MCS levels according to their respective average CQIs. There are three types of CQI feedback error correction, namely BS error correction, terminal error correction, and automatic error correction.

BS error correction is a BS-initiated CQI error correction scheme. There are two types of BS error correction schemes, namely a broadcasting message error correction scheme using a broadcast message from the BS and MAP message error correction scheme using a MAP message from the BS.

Figure 4:
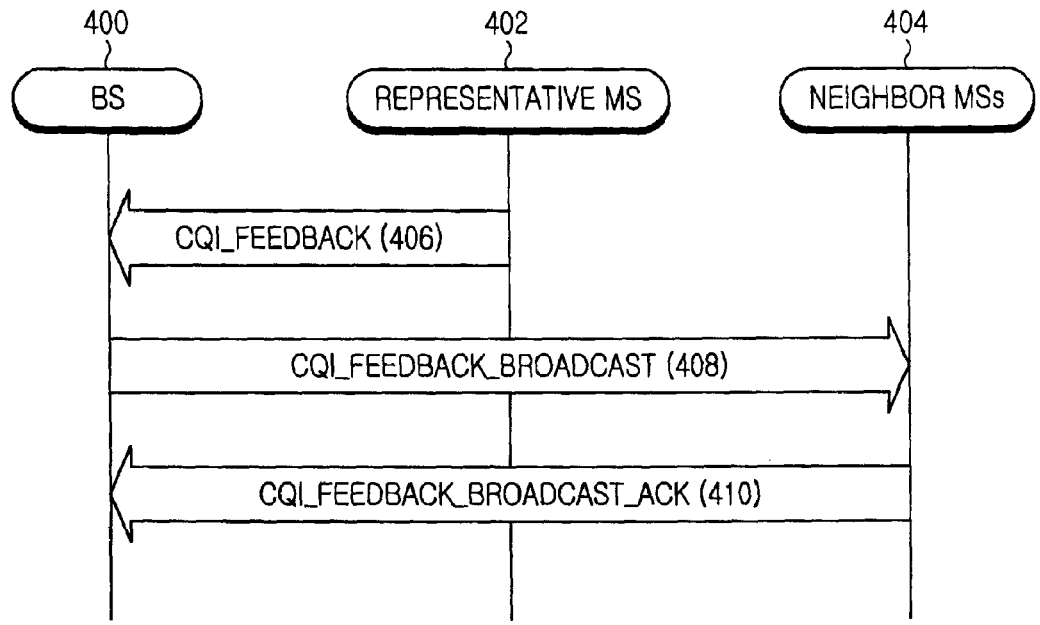
FIG. 4 is a diagram illustrating a signal flow for an operation for correcting CQI errors using a broadcast message in a BS in a communication system according to an exemplary embodiment of the present invention.

FIG. 4 is a diagram illustrating a signal flow for a broadcast message error correction operation of a BS in a communication system according to an exemplary embodiment of the present invention. With reference to FIG. 4, an operation for correcting CQI feedback errors by the broadcast message error correction scheme according to an exemplary embodiment of the present invention will be described below.

Referring to FIG. 4, upon receipt of a CQI_feedback message in step 406 including an average CQI from a representative MS 402 of a group, a BS 400 determines an MCS level based on the average CQI of the representative MS (hereinafter, referred to as a representative-MS MCS level) and sets the representative-MS MCS level for the individual MSs of the group.

In step 408, the BS 400 transmits a CQI_feedback_broadcast message including the representative-MS MCS level to neighbor MSs 404.

Upon receipt of the CQI_feedback_broadcast message, each of the neighbor MSs 404 compares the representative-MS MCS level set in the CQI_feedback_broadcast message with a desired MCS level (hereinafter, referred to as a neighbor-MS MCS level).

If the representative-MS MCS level is different from the neighbor-MS MCS level, the neighbor MS 404 transmits a CQI_feedback_broadcast_ACK message including its neighbor-MS MCS level to the BS 400 in step 410. The CQI_feedback_broadcast_ACK message is a message indicating successful reception of the CQI_feedback_broadcast message.

However, if the representative-MS MCS level is equal to the neighbor-MS MCS level, the neighbor MS 404 transmits a CQI_feedback_broadcast_ACK message without its neighbor-MS MCS level to the BS 400 in step 410.

Upon receipt of a CQI_feedback_broadcast_ACK with a neighbor-MS MCS level from a neighbor MS 404, the BS 400 detects the neighbor-MS MCS level by analyzing the CQI feedback_broadcast_ACK message and re-sets the representative-MS MCS level to the neighbor-MS MCS level for the neighbor MS 404. Then the BS 400 encodes and modulates data directed to the MSs of the group using the MCS levels set for them and transmits the coded and modulated data to the MSs.

When using the MAP message error correction scheme, the communication system transmits a MAP message to the MSs of the group before data transmission. The MAP message specifies MCS levels for the individual MSs. Upon receipt of the MAP message, the neighbor MSs detect their MCS levels and compare them with their desired neighbor-MS MCS levels.

If any neighbor MS has a neighbor-MS MCS level different from the detected MCS level, it generates an MCS level reset message including the neighbor-MS MCS level and transmits it to the BS.

Upon receipt of the MCS level reset message from the neighbor MS, the BS identifies the neighbor MS, changes the MCS level set for the neighbor MS to the neighbor-MS MCS level, encodes and modulates data directed to the neighbor MS of the group using the changed MCS level, and transmits the coded and modulated data to the neighbor MS.

Figure 5:
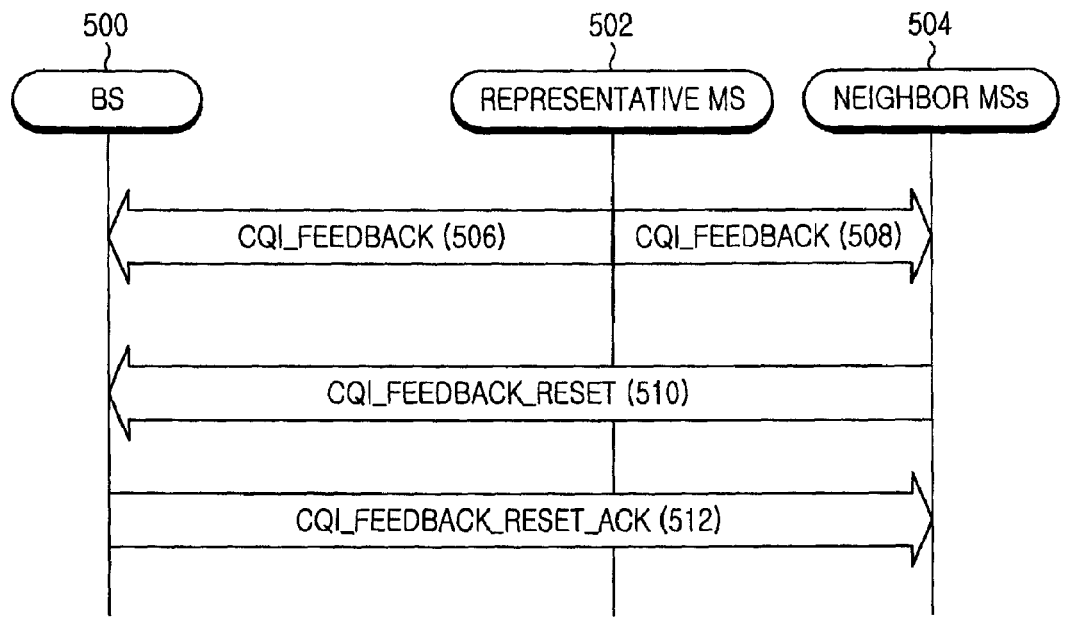
FIG. 5 is a diagram illustrating a signal flow for an operation for correcting CQI errors using an average CQI received from a representative MS in a neighbor MS in a communication system according to an exemplary embodiment of the present invention.

Terminal error correction is an MS-initiated CQI feedback error correction scheme. FIG. 5 is a diagram illustrating a signal flow for an operation in which a neighbor MS corrects a CQI feedback error using a representative-MS average CQI in a communication system according to an exemplary embodiment of the present invention. With reference to FIG. 5, a CQI feedback error correction operation based on terminal error correction according to an exemplary embodiment of the present invention will be described.

Referring to FIG. 5, a representative MS 502 transmits a CQI_feedback message with an average CQI to a BS 500 in step 506.

In step 508, neighbor MSs 504 listen to the CQI_feedback message from the representative MS 502. The neighbor MSs 504 may use the CQI feedback transmission resource information 306 of the group_CQI_fair message 300 in receiving the CQI_feedback message.

Each of the neighbor MSs 504 determines a representative-MS MCS level using the average CQI set in the CQI_feedback message and compares the representative-MS MCS level with its desired neighbor-MS MCS level.

If the representative-MS MCS level is different from the neighbor-MS MCS level, the neighbor MS 504 transmits a CQI_feedback_reset message including its average CQI to the BS 500 in step 510.

When receiving the CQI_feedback_reset message successfully, the BS 500 can transmit a CQI_feedback_reset_ACK message to the neighbor MS 504 in step 512. If the CQI_feedback_reset message is successfully received, the BS 500 identifies the neighbor MS and determines the neighbor-MS MCS level using the average CQI. Then the BS 500 resets the neighbor-MS MCS level for the neighbor MS 504, encodes and modulates data directed to the neighbor MS using the neighbor-MS MCS level, and transmits the coded and modulated data to the neighbor MS.

Automatic error correction is a scheme in which the BS automatically adjusts MCS levels for the neighbor MSs without receiving MCS levels or average CQIs for resetting MCS levels for the neighbor MSs.

There is a low probability that a representative-MS MCS level is different from a neighbor-MS MCS level by two or more levels. In other words, an MCS level requested by each neighbor MS is usually higher or lower than the representative-MS MCS level by one level, or equal to the representative-MS MCS level.

Therefore, if the data error rate of a neighbor MS is larger than a target data error rate, the BS decreases the MCS level of the neighbor MS by one level in the automatic error correction scheme. If the data error rate of a neighbor MS is less than a target data error rate, the BS increases the MCS level of the neighbor MS by one level. In this manner, the BS automatically adjusts the MCS levels of neighbor MSs.

Compared to the BS error correction scheme and the terminal error correction scheme, the automatic error correction scheme causes no data transmission overhead in resetting MSC levels for neighbor MSs.

Figure 6:
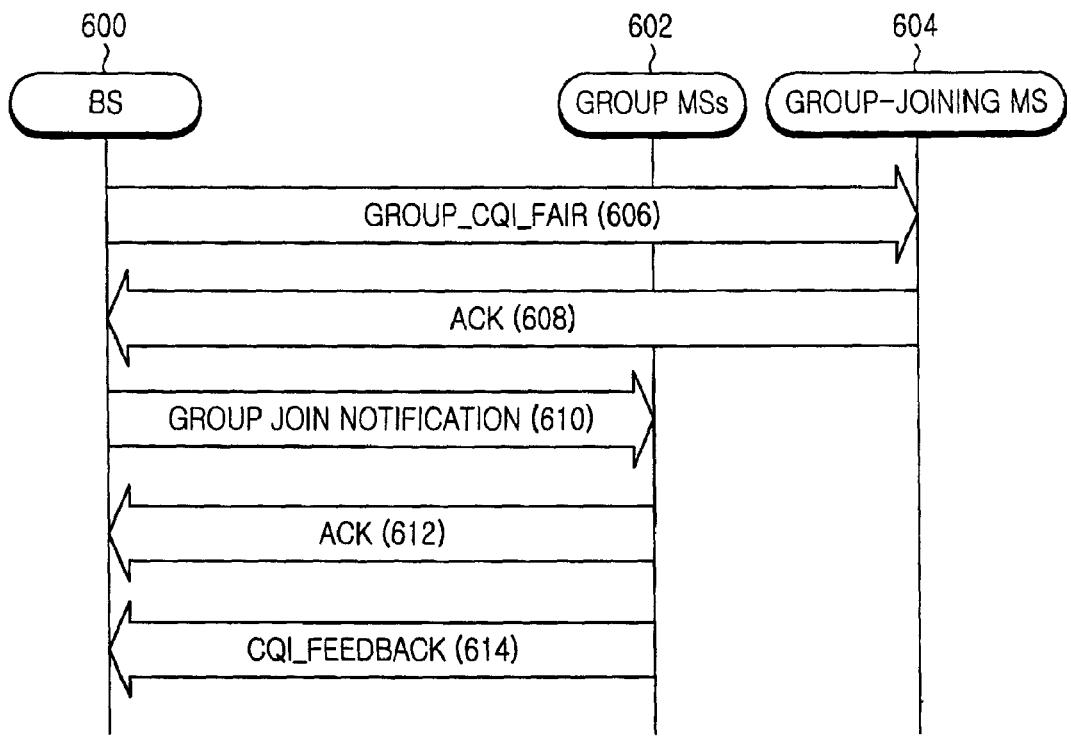
FIG. 6 is a diagram illustrating a signal flow for an operation for adding an MS to a group in a BS in a communication system according to an exemplary embodiment of the present invention.

FIG. 6 is a diagram illustrating a signal flow for an operation of adding an MS to a group in the BS in the communication system according to an exemplary embodiment of the present invention. With reference to FIG. 6, an operation of the BS for adding an MS similar in channel status and location to a preset group according to an exemplary embodiment of the present invention will be described.

Referring to FIG. 6, a BS 600 monitors whether there is any MS (referred to as a group-joining MS) located within a preset range and placed in a similar channel status to MSs 602 of a preset group (referred to as group MSs).

In the presence of a group-joining MS 604, the BS 600 generates a new group_CQI_fair message by increasing the group MS number 302 of a group_CQI_fair message transmitted to the group MSs 602 by one and adding information about the group-joining MS 604 to the group MS information 304 and transmits the new group_CQI_fair message to the group-joining MS 604 in step 606.

Upon successfully receiving the new group_CQI_fair message, the group-joining MS 604 transmits an ACK message to the BS 600 in step 608. The group-joining MS 604 can determine when it will be designated as a representative MS from the new group_CQI_fair message.

In step 610, the BS 600 transmits to the group MSs 602 a group join notification message indicating the group-joining MS 604 has joined the group. The group join notification message can include information about the group-joining MS 604.

If the group join notification message is successfully received, each of the group MSs 602 increases the number of MSs in the pre-stored group MS number 302 and adds the group-joining MS information to the stored group MS information 304. Then the individual group MSs 602 transmit ACK messages for the group join notification message to the BS 600 in step 612.

In step 614, a representative MS of the group MSs 602 now including the group-joining MS 604 generates a CQI_feedback message including an average CQI corresponding to its channel status and transmits it to the BS 600.

If the group-joining MS 604 is designated later as the representative MS, it can transmit a CQI_feedback message including an average CQI corresponding to its channel status to the BS 600.

Figure 7:
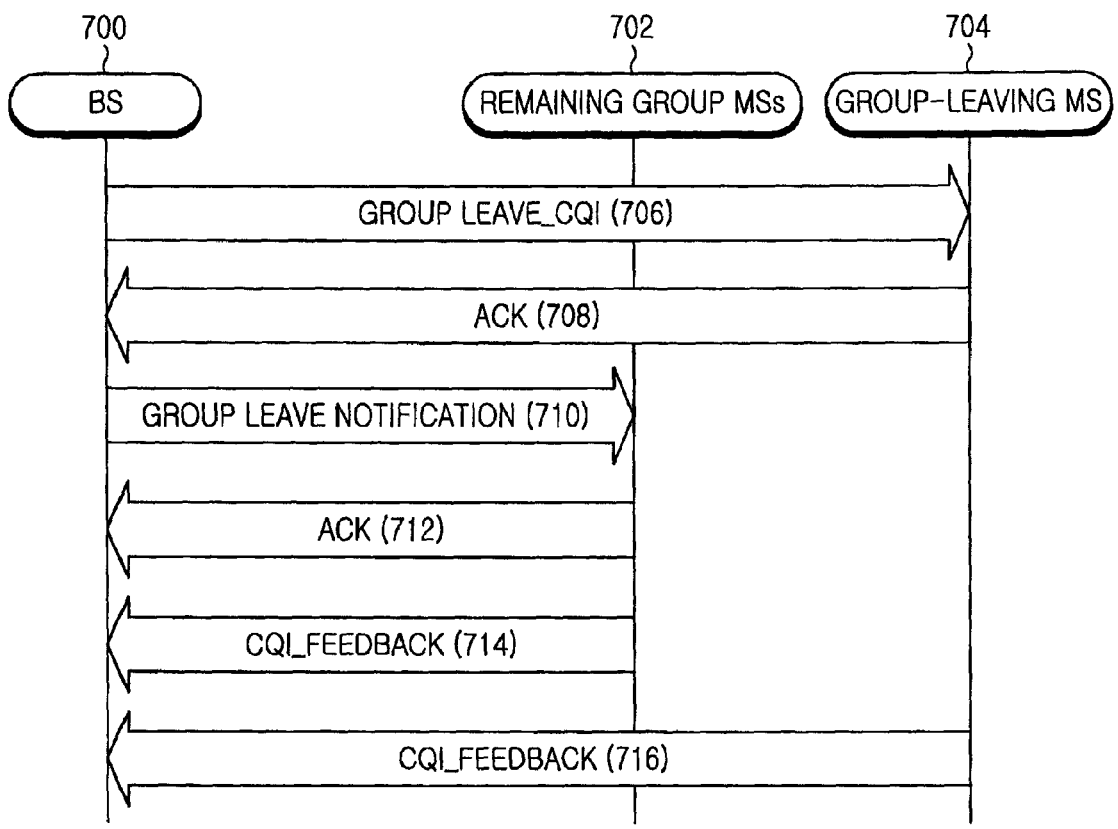
FIG. 7 is a diagram illustrating a signal flow for an operation for excluding an MS from a group in a BS in a communication system according to an exemplary embodiment of the present invention.

FIG. 7 is a diagram illustrating a signal flow for an operation in which a BS excludes an MS from a group in a communication system according to an exemplary embodiment of the present invention. With reference to FIG. 7, an operation of a BS for excluding an MS in a different channel status from those of other group MSs from a group will be described.

Referring to FIG. 7, a BS 700 monitors whether there is any group MS (group-leaving MS) that has moved outside a preset range or that is in a channel status different from those of the other group MSs by a preset value or higher. In the presence of such a group-leaving MS 704, the BS 700 transmits a group leave_CQI message to the group-leaving MS 704 in step 706.

When receiving the group leave_CQI message, the group-leaving MS 704 leaves the group, generates a CQI_feedback message including its average CQI to be transmitted independently to the BS 700, and transmits an ACK message for the group leave_CQI message to the BS 700 in step 708.

The BS 700 generates a group leave notification message indicating that the group-leaving MS 704 has left the group and transmits it to the other group MSs 702 in step 710. The group leave notification message includes information about the group-leaving MS 704.

Upon successful receipt of the group leave notification message, the other group MSs 702 decrease the number of MSs in a stored group MS number 302 by one and eliminate the information about the group-leaving MS 704 from the stored group MS information 304. The other group MSs 702 each determine from the group MS number 302, the group MS information 304, and the CQI feedback transmission period information 308 as to when they will be designated as a representative MS.

Then the other group MSs 702 individually transmit ACK messages for the group leave notification message to the BS 700 in step 712.

In step 714, a representative MS of the other group MSs 702 generates a CQI_feedback message including an average CQI corresponding to its channel status and transmits it to the BS 700.

In step 716, the group-leaving MS 704 generates a CQI_feedback message including an average CQI corresponding to its channel status and transmits it independently to the BS 700.

In the above fair average CQI feedback scheme, the group MSs sequentially transmit CQI_feedback messages to the BS. However, if the order of transmitting the CQI_feedback messages is not kept, the group MSs transmit their CQI_feedback messages simultaneously, causing CQI feedback collisions, or they do not transmit the CQI_feedback messages, causing CQI feedback skipping. As the channel status of the communication system changes, the CQI feedback transmission resource information 306 and the CQI feedback transmission period information 308 may be changed.

To avoid the CQI feedback collision or skipping, the individual group MSs should reset the group MS number 302, their own MS information, and the CQI feedback transmission period information 308 periodically. Therefore, the BS 700 transmits the group_CQI_fair message 300 to the group MSs periodically to help the group MSs to reset the information. As a consequence, the fair average CQI feedback scheme becomes more reliable.

Figure 8:
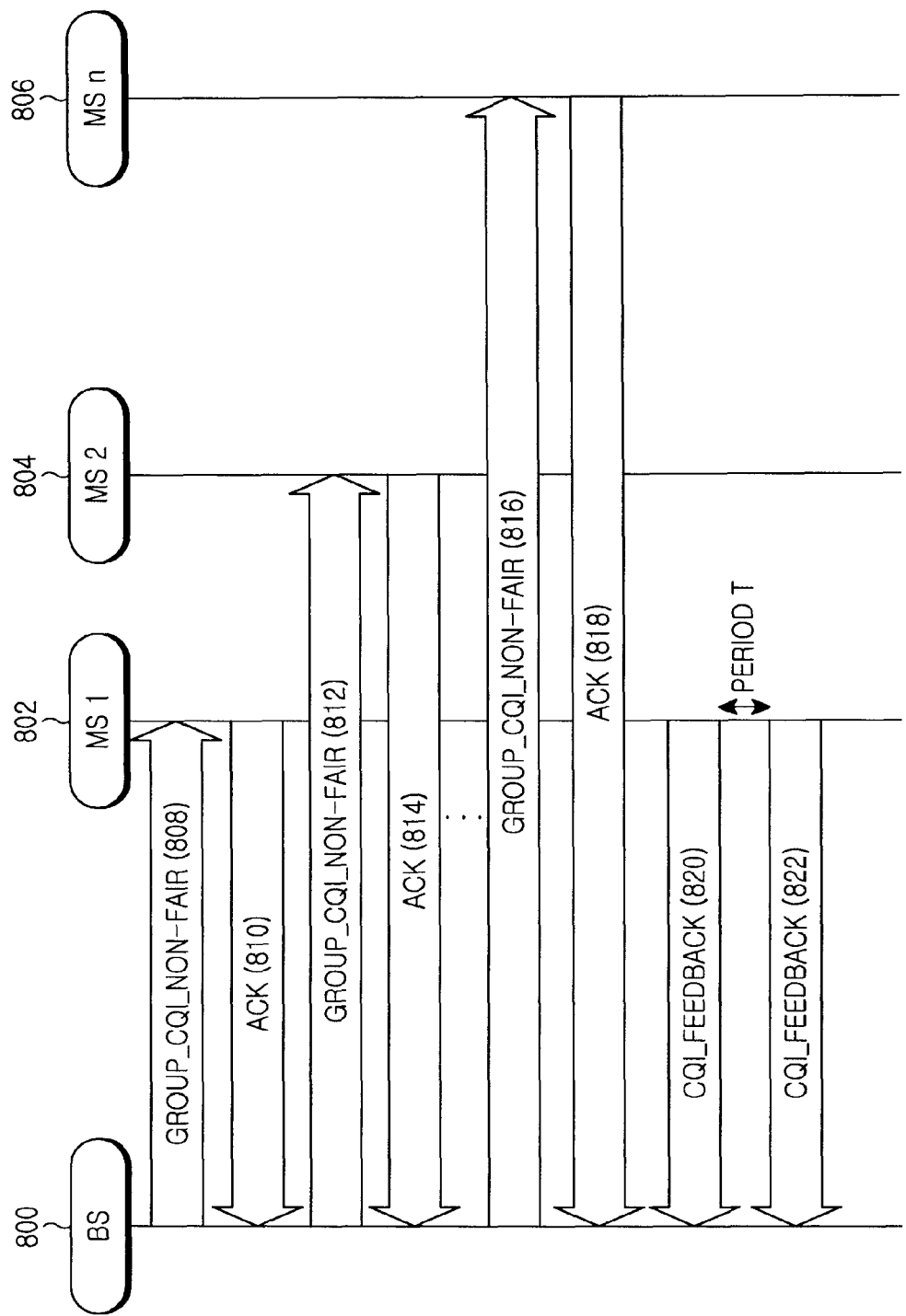
FIG. 8 is a diagram illustrating a signal flow for an operation for receiving an average CQI from a particular MS in a BS in a communication system according to an exemplary embodiment of the present invention.

FIG. 8 is a diagram illustrating a signal flow for a non-fair average CQI feedback operation in which a BS selects a representative MS and the representative MS continuously feeds back an average CQI in a communication system according to an exemplary embodiment of the present invention.

In the non-fair average CQI feedback scheme, the BS designates a particular one of group MSs belonging to a group as a representative MS and the representative MS is fixed to continue to feed back an average CQI.

Non-fair average CQI feedback is considered based on how the representative MS is selected. There are three types of representative MS selection, including random selection, maximum power-selection, and best position-selection.

Random selection is a scheme in which the BS designates a random MS as a representative MS. In the maximum power-selection scheme, the BS designates an MS with a maximum power as a representative MS. In the best position-selection scheme the BS designates an MS having the best channel status as a representative MS.

In FIG. 8, the BS selects a representative MS in the random-selection manner and the representative MS feeds back an average CQI.

For notational simplicity, it is assumed there are n MSs in a group.

Referring to FIG. 8, a BS 800 groups MSs that are located within a preset range and in similar channel statuses into the same group among MSs within its cell and transmits a group_CQI-non-fair message to a first MS 802 (MS 1) of the group MSs in step 808.

The structure of the group_CQI_non-fair message is illustrated in FIG. 9. Referring to FIG. 9, a group_CQI_non-fair message 900 includes representative MS information 902, CQI feedback transmission resource information 904 required for a representative MS to feedback an average CQI, and CQI feedback transmission period information 906 required for the representative MS to feed back an average CQI periodically. The representative MS information 906 can be information about the index of the representative MS.

Upon receipt of the group_CQI_non-fair message, MS 1 transmits an ACK message indicating successful reception of the group_CQI_non-fair message to the BS 800 in step 810.

In step 812, the BS 800 transmits the group_CQI_non-fair message to a second MS 804 (MS 2) of the group. In step 814, MS 2 transmits an ACK message to the BS 800.

In step 816, the BS 800 transmits the group_CQI_non-fair message to an $n^{th}$ MS 806 (MS n) of the group. In step 818, MS n transmits an ACK message to the BS 800.

Steps 808 through 818 exemplify transmission of the group_CQI_non-fair message from the BS 800 to the individual group MSs and transmission of the ACK messages from the group MSs to the BS 800. These steps are referred to as a random-selection non-fair average CQI feedback initialization.

If the BS 800 fails to receive an ACK message from any group MS, it can retransmit the group_CQI_non-fair message to the group MS. Each group MS can determine whether it is designated as a representative MS based on the representative MS information 902 set in the group_CQI_non-fair message.

If MS 1 is designated as the representative MS, it averages the CQIs of subchannels allocated to it, generates a CQI_feedback message including the average CQI, and transmits the CQI_feedback message to the BS 800 in resources indicated by the CQI feedback transmission resource information 904 in step 820.

In step 822, MS 1 periodically generates a CQI_feedback message according to a CQI feedback transmission period T and transmits it to the BS 800. The CQI feedback transmission period T is known from the CQI feedback transmission period information 906.

Figure 10:
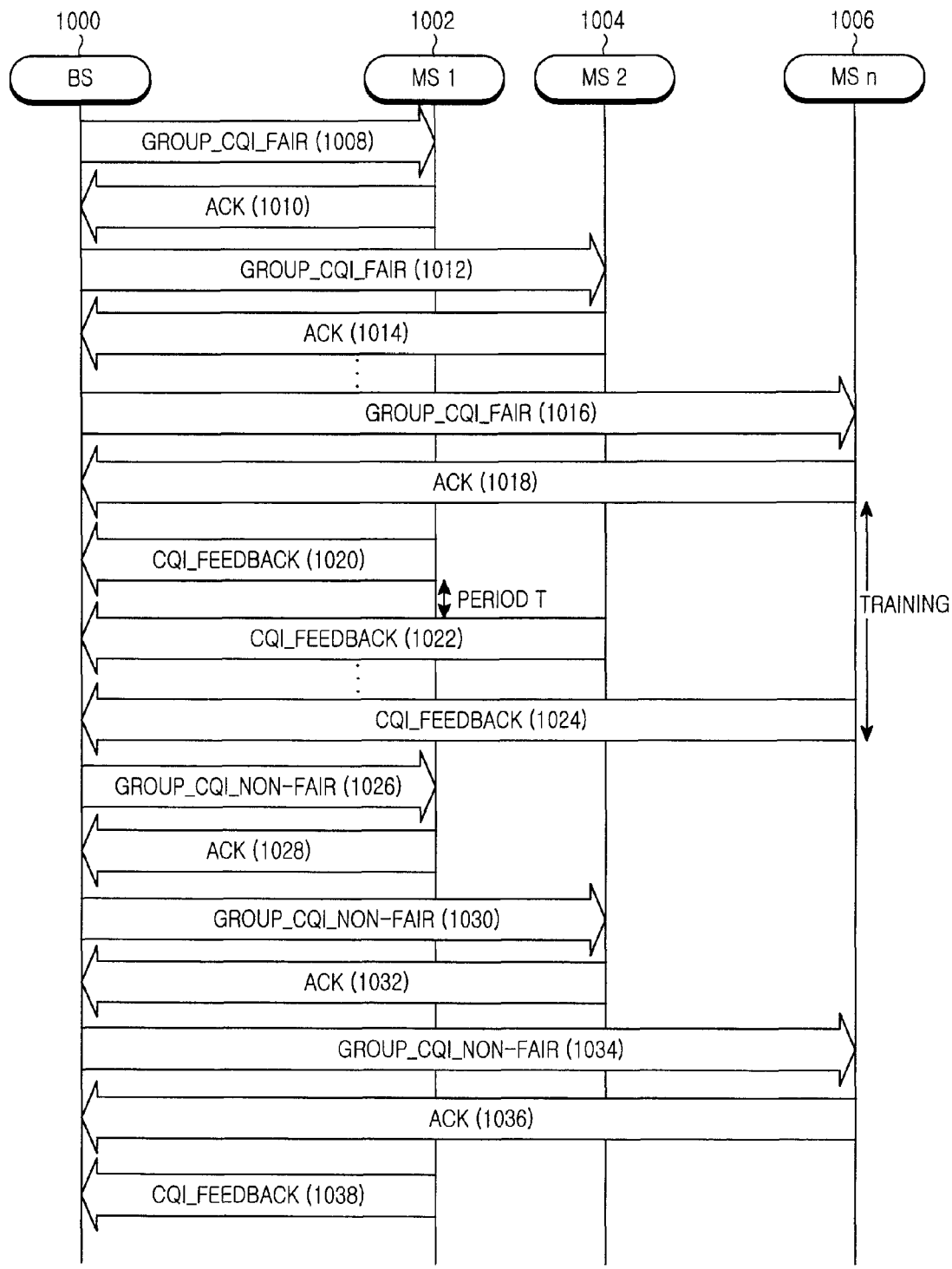
FIG. 10 is a diagram illustrating an operation for receiving an average CQI from an MS having a minimum data error rate in a BS in a communication system according to an exemplary embodiment of the present invention.

FIG. 10 is a diagram illustrating a best position-selection non-fair CQI feedback operation in which a BS selects a representative MS in a best position-selection manner and the representative MS continuously feeds back an average CQI in a communication system according to an exemplary embodiment of the present invention.

For notational simplicity, it is assumed that there are n MSs in a group.

Referring to FIG. 10, a BS 1000 groups MSs that are located within a preset range and in similar channel statuses into the same group among MSs within its cell and transmits a group_CQI_fair message to a first MS 1002 (MS 1) among the group MSs in step 1008.

The structure of the group_CQI_fair message is illustrated in FIG. 3 and thus will not be repeated herein.

Upon receipt of the group_CQI_fair message, MS 1 transmits an ACK message indicating successful reception of the group_CQI_fair message to the BS 1000 in step 1010.

In step 1012, the BS 1000 transmits the group_CQI_fair message to a second MS 1004 (MS 2) of the group. In step 1014, MS 2 transmits an ACK message to the BS 1000.

In step 1016, the BS 1000 transmits the group_CQI_fair message to an $n^{th}$ MS 1006 (MS n) of the group. In step 1018, MS n transmits an ACK message to the BS 1000.

Steps 1008 through 1018 exemplify transmission of the group_CQI_fair message from the BS 1000 to the individual group MSs and transmission of the ACK messages from the group MSs to the BS 1000.

If the BS 1000 fails to receive an ACK message from any group MS, it can retransmit the group_CQI_fair message to the group MS.

Each group MS can determine when it will be designated as a representative MS based on the group MS number 302, the group MS information 304, and the CQI feedback transmission period information 308 set in the group_CQI_fair message.

If MS 1 is designated as the representative MS, it averages the CQIs of subchannels allocated to it, generates a CQI_feedback message including the average CQI, and transmits the CQI_feedback message to the BS 1000 in resources indicated by the CQI feedback transmission resource information 306 in step 1020.

If MS 2 is designated as the representative MS, it averages the CQIs of subchannels allocated to it, generates a CQI_feedback message including the average CQI, and transmits the CQI_feedback message to the BS 1000 in resources indicated by the CQI feedback transmission resource information 306 in step 1022.

If MS n is designated as the representative MS, it averages the CQIs of subchannels allocated to it, generates a CQI_feedback message including the average CQI, and transmits the CQI_feedback message to the BS 1000 in resources indicated by the CQI feedback transmission resource information 306 in step 1024.

Steps 1020 through 1024 exemplify transmission of the CQI_feedback message from the representative MS to the BS 1000. These steps are referred to as training and may each occur after a period T. The MSs of the group are sequentially designated as the representative MS in a preset order and the representative MS generates and transmits a CQI_feedback message to the BS 1000.

Then, the BS selects an MS having the lowest data error rate from among the group MSs based on the average CQIs received from them, designates the selected MS as a representative MS, generates representative MS information 902 including information about the selected MS, and transmits a group_CQI_non-fair message including the representative MS information 902 to MS 1 in step 1026.

In step 1028, upon receipt of the group_CQI_non-fair message, MS 1 transmits an ACK message indicating successful reception of the group_CQI_non-fair message to the BS 1000.

In step 1030, the BS 1000 transmits the group_CQI_non-fair message to MS 2. In step 1032, MS 2 transmits an ACK message to the BS 1000.

In step 1034, the BS 800 transmits the group_CQI_non-fair message to MS n of the group. In step 1036, MS n transmits an ACK message to the BS 1000.

Steps 1026 through 1036 exemplify transmission of the group_CQI_non-fair message from the BS 1000 to the individual group MSs and transmission of the ACK messages from the group MSs to the BS 1000.

Each of the group MSs can determine whether it is designated as a representative MS from the representative MS information 902 set in the group_CQI_non-fair message.

Steps 1008 through 1036 are referred to as a best position-selection non-fair average CQI feedback initialization.

If MS 1 is designated as the representative MS, it averages the CQIs of subchannels allocated to it, generates a CQI_feedback message including the average CQI, and periodically transmits the CQI_feedback message to the BS 1000 according to the CQI feedback transmission resource information 904 and the CQI feedback transmission period information 906 in step 1038.

In this best position-selection non-fair average CQI feedback scheme, the BS selects an MS in the best channel status from among the group MSs and designates the selected MS as a representative MS. However, the best MS may change as the group MSs move or their channel statuses change. Therefore, the BS measures the data error rate of a CQI_feedback message received from the representative MS. If the data error rate is equal to or larger than a preset value, the best position-selection non-fair average CQI feedback initialization can be repeated so as to select a new representative MS from among the group MSs.

Maximal power-selection is the same as the best position-selection illustrated in FIG. 10, except that the former does not have the training process.

More specifically, the BS detects MSs located within a preset range and having similar channel statuses from among MSs within the cell of the BS and groups them. The BS transmits a group_CQI_fair message to the group MSs and each of the group MSs transmits an ACK message including information about its remaining battery power to the BS. The BS searches for an MS with the largest amount of remaining battery power in the group MSs and designates the MS as a representative MS. The BS generates representative MS information 902 including information about the representative MS, generates a group_CQI_non-fair message including the representative MS information 902, and transmits it to the group MSs. The individual group MSs determine from the group_CQI_non-fair message whether they are designated as the representative MS. Then the representative MS periodically generates a CQI_feedback message with an average CQI and transmits it to the BS.

The BS determines an MCS level based on the average CQI received from the representative MS, encodes and modulates data for the group MSs using the MCS level, and transmits the coded and modulated data to the group MSs.

As stated before, an MCS level requested by a neighbor MS may be different from the MCS level determined based on the average CQI of the representative MS. If the BS transmits data to the group MSs using the determined MCS level, the data rates of all of the channels are reduced. Hence, the communication system can use CQI feedback error correction such that the neighbor MSs can set different MCS levels according to their average CQIs.

CQI error correction schemes have been described above and thus will not be repeated herein.

In the non-fair average CQI feedback scheme, a new MS in a similar channel status may join a group or an MS in a different channel status may leave the group.

To allow a new MS to join the group, the BS monitors whether there is any MS that has moved within a preset range (i.e. group area) and is placed in a similar channel status as those of the group MSs.

In the presence of such a group-joining MS, the BS transmits to the group-joining MS a grop_CQI_non-fair message that has been transmitted to the group MSs, thus forming a new group.

Upon successful receipt of the group_CQI_non-fair message, the group-joining MS transmits an ACK message to the BS, since it has been admitted to the group.

The BS receives an average CQI from a representative MS of the new group and determines an MCS level based on the average CQI. Then the BS encodes and modulates data for the group MSs using the MCS level and transmits the coded and modulated data to the group MSs.

To exclude an MS from the group, the BS monitors whether there is any MS that has moved out of the preset group area and is placed in a different channel status from those of the group MSs. Alternatively, the BS monitors whether there is any MS that has moved out of the preset group area or is placed in a different channel status from those of the group MSs In the presence of such a group-leaving MS, the BS transmits a group leave_CQI message to the group-leaving MS, thus forming a new group.

Upon receipt of the group leave_CQI message, the group-leaving MS leaves the group, controls a CQI_feedback message to be independently transmitted to the BS, and transmits an ACK message for the group leave_CQI message to the BS. Then, the group-leaving MS individually generates a CQI_feedback message according to its channel status and transmits it to the BS.

The BS receives an average CQI from a representative MS of the new group and determines an MCS level based on the average CQI. Then the BS encodes and modulates data for the group MSs using the MCS level and transmits the coded and modulated data to the group MSs.

If the group-leaving MS is the representative MS, the BS should designate another group MS as the representative MS. For this purpose, the BS selects a new representative MS by performing the non-fair average CQI feedback initialization again and receives a CQI_feedback message from the new representative MS periodically.

The non-fair average CQI feedback scheme selects one of group MSs as a representative MS and the representative MS periodically feeds back an average CQI. If the representative MS information 902 is not transmitted reliably to the group MSs, a plurality of group MSs may transmit CQI_feedback messages simultaneously, causing collision or may not transmit CQI_feedback messages. Also, the CQI feedback transmission resource information 904 and the CQI feedback transmission period information 906 may change according to channel status.

Accordingly, the BS periodically transmits the group_CQI_non-fair message 900 to the group MSs so that the group MSs can reset the representative MS information 902, the CQI feedback transmission resource information 904, and the CQI feedback transmission period information 906. Therefore, the non-fair average CQI feedback becomes more reliable.

Figure 11:
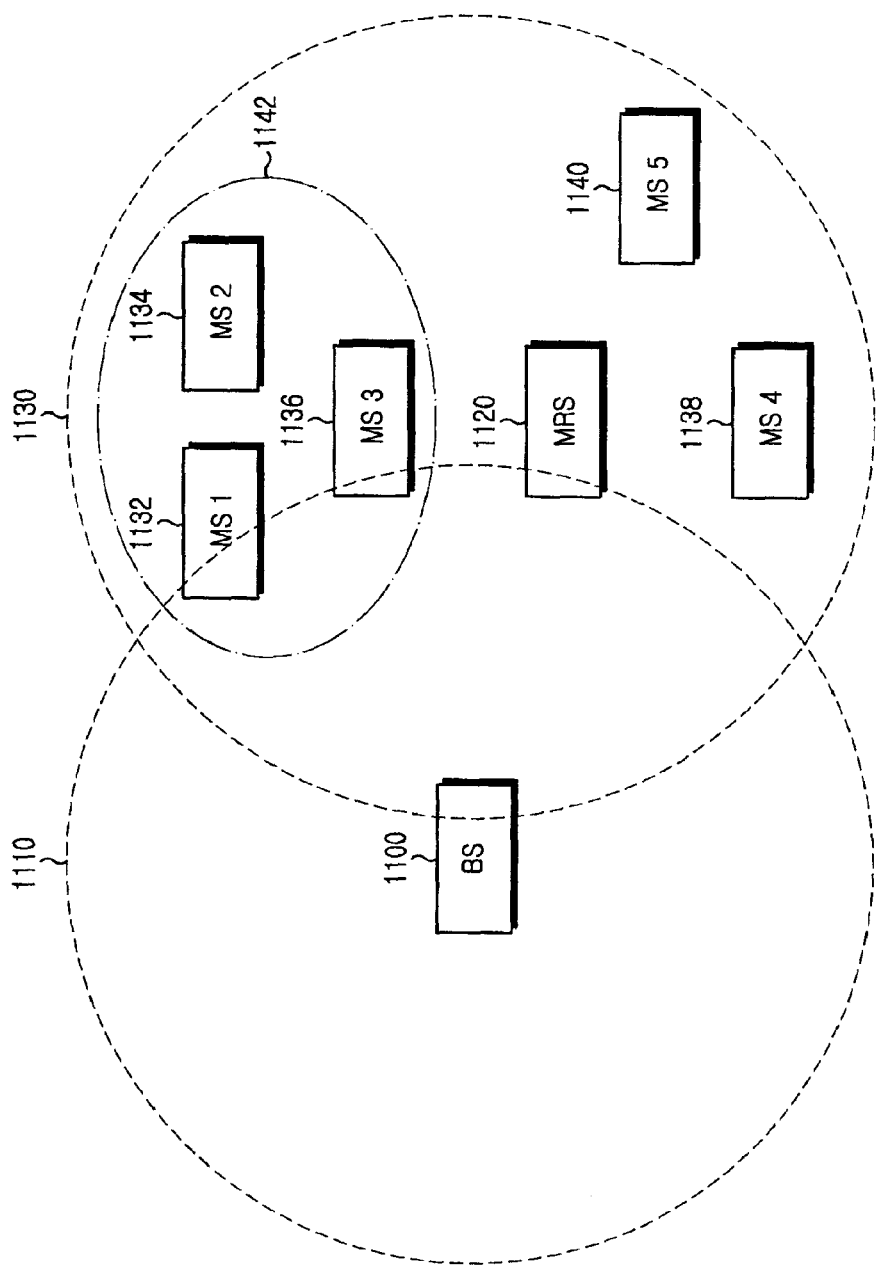
FIG. 11 illustrates the configuration of a communication system according to an exemplary embodiment of the present invention.

FIG. 11 illustrates the configuration of a communication system having a multi-hop communication network according to an exemplary embodiment of the present invention. With reference to FIG. 11, components of the communication system will be described below.

Referring to FIG. 11, the communication system includes a cell 1110, a BS 1100 for managing the cell 1110, an MRS 1120, a cell 1130 covered by the MRS 1120, and first to fifth MSs 1132, 1134, 1136, 1138 and 1140 (MS 1 to MS 5) within the cell 1130.

If MS 1, MS 2 and MS 3 are located within a preset range and placed in similar channel statuses, the BS 1100 can group MS 1, MS 2 and MS 3 into a group 1142 and receives an average CQI from the MRS 1120 as a representative of MS 1, MS 2 and MS 3. The BS 1100 selects an MCS level by analyzing the average CQI, encodes and modulates data to be transmitted to the MSs of the group 1142 according to the MCS level, and transmits the coded and modulated data to the MRS 1120.

The MRS 1120 relays the coded and modulated data to the group MSs 1132, 1134 and 1136.

In this manner, the MRS 1120 periodically transmits an average CQI to the BS 1100 as a representative of the group MSs, like a representative MS in a single-hop communication network. The MRS 1120 may be provided in a mass transportation vehicle such as a city bus, an express bus, a subway and the like. An area within which MSs are grouped into the same group is variable depending on the type of a vehicle. For example, if the MRS 1120 is in a city bus, the grouping area can be 5.89 m. When the MRS 1120 is in an express bus, the grouping area can be 6.45 m.

Figure 12:
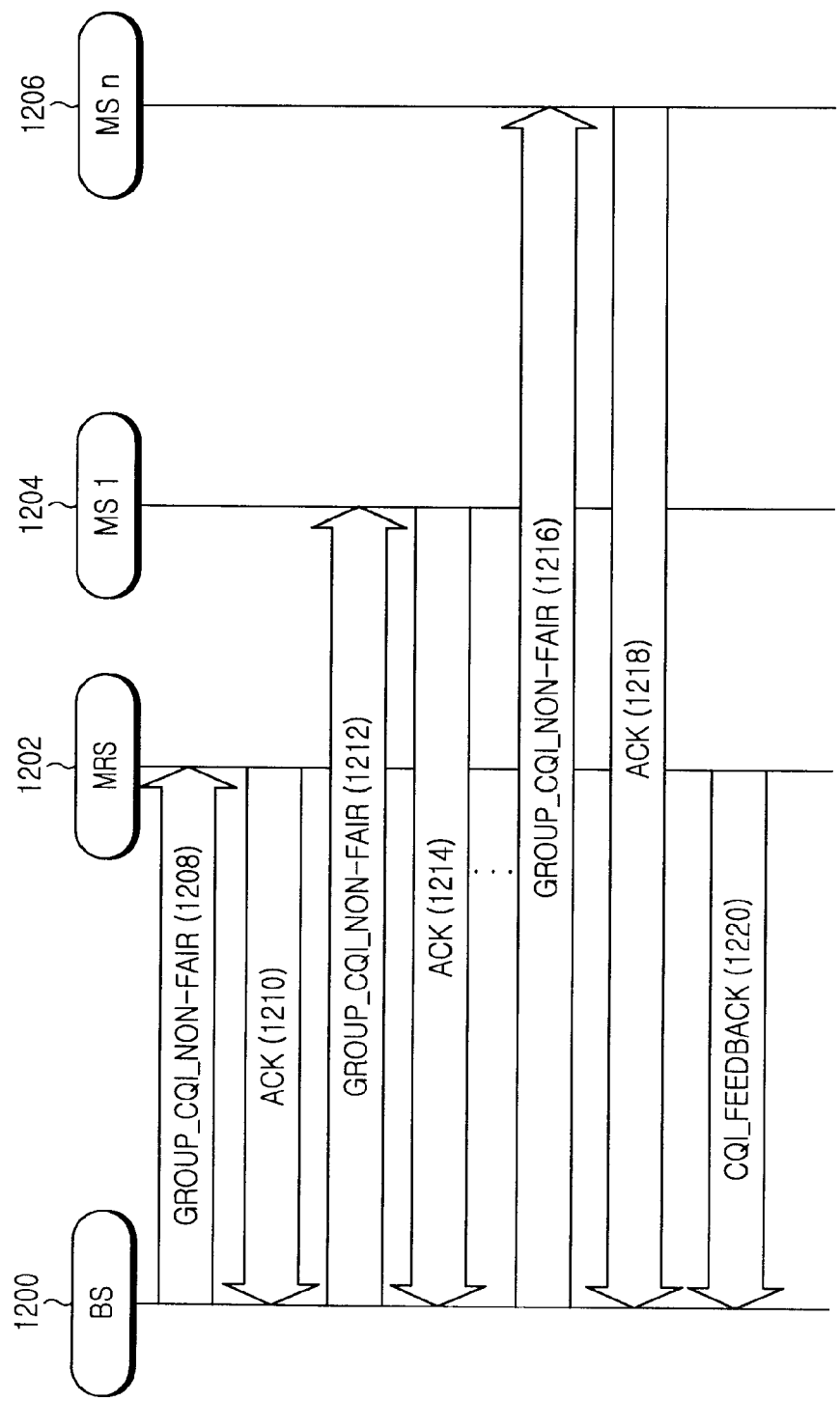
FIG. 12 is a diagram illustrating a signal flow for an operation for receiving an average CQI from an Mobile Relay Stations (MRS) in a BS in a communication system according to an exemplary embodiment of the present invention.

FIG. 12 is a diagram illustrating a signal flow for an operation for receiving an average CQI from a MRS in a BS in a communication system according to an exemplary embodiment of the present invention. With reference to FIG. 12, an operation for receiving an average CQI from the MRS in the BS according to an exemplary embodiment of the present invention will be described below.

For notational simplicity, it is assumed that the MRS and group MSs are in similar channel statuses, the MRS assists with data transmission for the group MSs, and there are n MSs in a group.

Referring to FIG. 12, a BS 1200 groups MSs that are located within a preset range and in similar channel statuses into the same group among MSs within the cell of an MRS 1202 and transmits a group_CQI_non-fair message to the MRS 1202 in step 1208.

Figure 13:
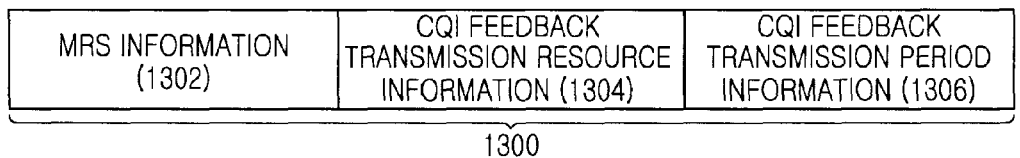
FIG. 13 illustrates the structure of a group_CQI_non-fair message transmitted from a BS in a communication system according to an exemplary embodiment of the present invention.

The structure of the group_CQI_non-fair message is illustrated in FIG. 13. Referring to FIG. 13, a group_CQI_non-fair message 1300 includes MRS information 1302, CQI feedback transmission resource information 1304, and CQI feedback transmission period information 1306.

Upon receipt of the group_CQI_non-fair message, the MRS 1202 transmits an ACK message indicating successful reception of the group_CQI_non-fair message to the BS 1200 in step 1210.

In step 1212, the BS 1200 transmits the group_CQI_non-fair message to a first MS 1204 (MS 1) via the MRS 1202. In step 1214, MS 1 transmits an ACK message indicating successful reception of the group_CQI_non-fair message to the BS 1200 via the MRS 1202.

The BS 1200 transmits the group_CQI_non-fair message to an $n^{th}$ MS 1206 (MS n) of the group via the MRS 1202 in step 1216 and MS n transmits an ACK message to the BS 1200 via the MRS 1202 in step 1218.

Steps 1208 through 1218 exemplify transmission of the group_CQI_non-fair message from the BS 1200 to the MRS 1202 and the group MSs 1204 and 1206 and transmission of the ACK messages from the group MSs 1204 and 1206 and the MRS 1202 to the BS 1200.

If the BS 1200 fails to receive an ACK message from any group MS or the MRS 1202, it can retransmit the group_CQI_non-fair message to the group MS or the MRS 1202.

In step 1220, the MRS 1202 is aware that it represents the group MSs from the group_CQI_non-fair message and generates an average CQI of its subchannels. The MRS 1202 generates a CQI_feedback message including the average CQI and transmits the CQI_feedback message to the BS 1200 periodically according to the CQI feedback transmission resource information 1304 and the CQI feedback transmission period information 1306.

The BS 1200 periodically receives the CQI_feedback message including an average CQI from the MRS 1202 and determines an MCS level based on the average CQI. The BS 1200 then encodes and modulates data directed to the group MSs using the MCS level and transmits the coded and modulated data to the MRS 1202. The MRS 1202 relays the received data to the group MSs.

In the communication system, the BS selects an MCS level based on an average CQI received from the MRS and applies the MCS level commonly to the group MSs. However, MCS levels requested by the group MSs may be different from the selected MCS level. If the BS transmits data to the group MSs using the selected MCS level, the data rates of all of the channels are reduced.

Hence, the communication system can use CQI feedback error correction such that the group MSs can set different MCS levels according to their average CQIs. CQI error correction schemes have been described above and thus will not be repeated.

In the average CQI feedback scheme, it may occur that a new MS joins the group as it moves into a preset group area and has a similar channel status, or an MS leaves the group as it moves out of the group area or has a different channel status.

To allow a new MS to join the group, the BS monitors whether there is any MS that has moved to the group area and is placed in a similar channel status to those of the group MSs. In the presence of such a group-joining MS, the BS transmits to the group-joining MS a group_CQI_non-fair message that has been transmitted to the group MSs, thus forming a new group.

Upon successful receipt of the group_CQI_non-fair message, the group-joining MS transmits an ACK message to the BS, since it has been admitted to the group.

The BS periodically receives an average CQI from the MRS and determines an MCS level based on the average CQI. Then the BS encodes and modulates data for the group MSs using the MCS level, prior to transmission.

To exclude an MS from the group, the BS monitors whether there is any MS that has moved out of the preset group area or is placed in a different channel status from those of the group MSs. In the presence of such a group-leaving MS, the BS transmits a group leave_CQI message to the group-leaving MS, thus forming a new group.

Upon receipt of the group leave_CQI message, the group-leaving MS leaves the group, controls a CQI_feedback message to be individually transmitted to the BS, and transmits an ACK message for the group leave_CQI message to the BS. Then, the group-leaving MS individually generates a CQI_feedback message according to its channel status and transmits it to the BS.

The BS periodically receives an average CQI from the MRS and determines an MCS level based on the average CQI. Then the BS encodes and modulates data for the group MSs using the MCS level, prior to transmission.

When the multi-hop communication system uses the non-fair average CQI feedback scheme, the CQI feedback transmission resource information 1304 and the CQI feedback transmission period information 1306 may change according to channel status.

Accordingly, the BS periodically transmits the group_CQI_non-fair message 1300 to the group MSs via the MRS so that the group MSs can reset the CQI feedback transmission resource information 1304 and the CQI feedback transmission period information 1306. Therefore, the periodic transmission of the group_CQI_non-fair message renders the non-fair average CQI feedback more stable.

Figure 14:
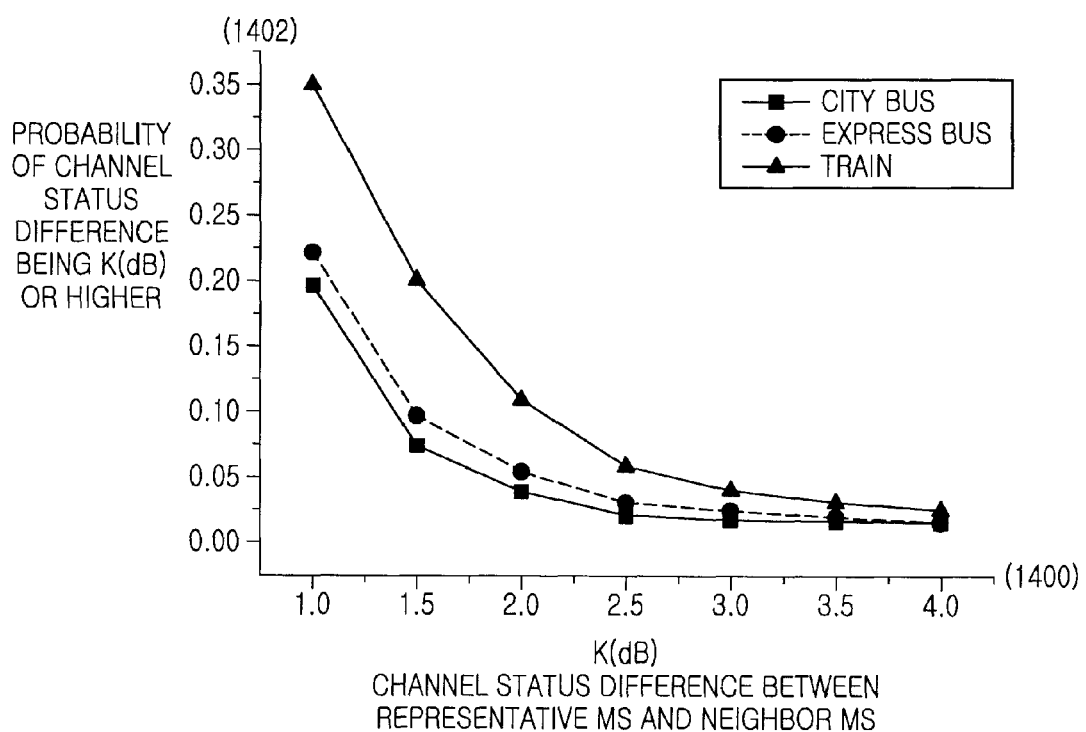
FIG. 14 is a graph illustrating probabilities that a channel status difference between a representative MS and neighbor MSs is K(dB) or higher in a communication system according to an exemplary embodiment of the present invention.

FIG. 14 is a graph illustrating probabilities that a channel status difference between a representative MS and neighbor MSs is K dB or higher in the suburbs in a communication system according to an exemplary embodiment of the present invention.

It is assumed that MSs are grouped, respectively in an express bus, a city bus, and a train and the maximum distance between MSs in the groups is assumed to be 6.45, 5.89, and 12.4 m respectively.

Referring to FIG. 14, a horizontal axis 1400 represents K(dB) being the channel status difference between a representative MS and neighbor MSs and a vertical axis 1402 represents a probability of the channel status difference being K(dB) or higher.

In the express bus and the city bus, the probability of the channel status difference being K(dB) or higher is below 5%.

On the assumption that if K is 2 dB or higher, an MCS level is changed, 95% of the group MSs in a bus will have the same MCS level as that of the representative MS and 5% of them will have different MCS levels.

The graph reveals that the probability of K being 4 dB or higher is almost 0%. In general, when K is 4 dB to 8 dB or higher, the difference between MCS levels is two or more levels. Since the probability of K being 4 dB or higher is almost 0%, the probability of the MCS level difference being two or more levels is also almost 0%.

Figure 15:
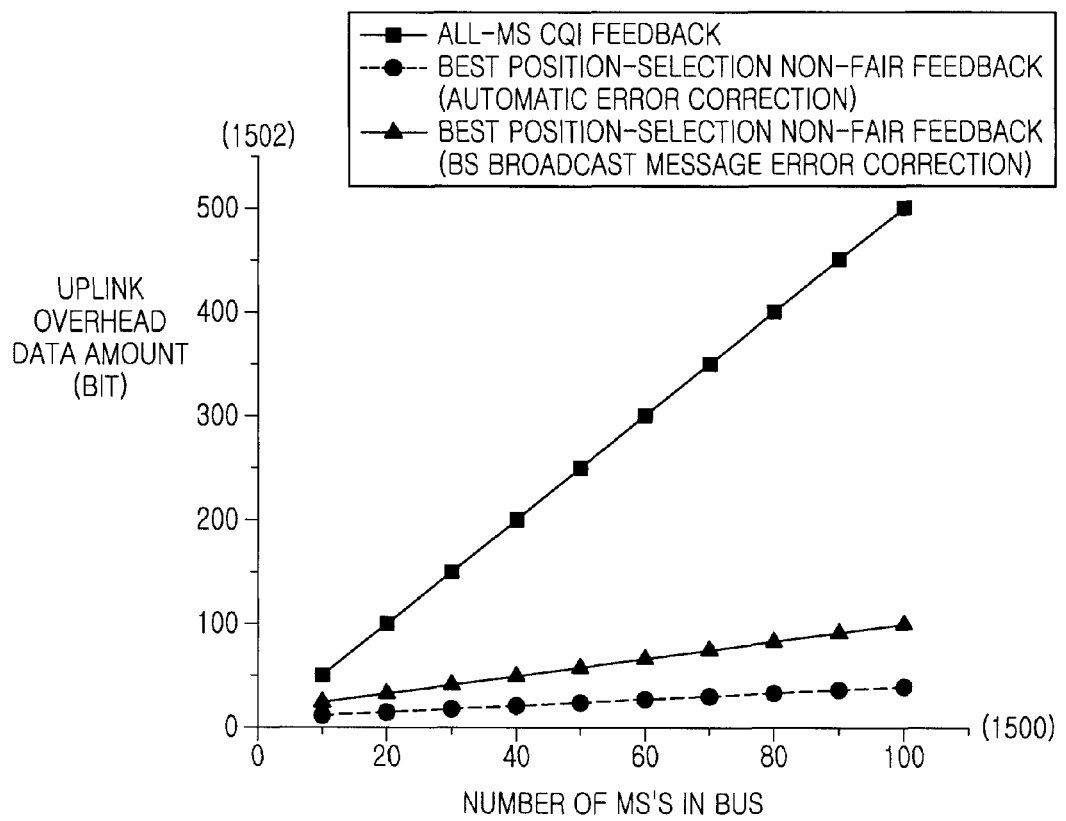
FIG. 15 is a graph illustrating uplink overhead data amounts when the number of MSs in a group increases in a communication system according to an exemplary embodiment of the present invention.

FIG. 15 is a graph illustrating uplink overhead data amounts when the number of MSs in a group increases in a communication system according to an exemplary embodiment of the present invention.

It is assumed that MSs located in the same bus are grouped into the same group, 8 MCS levels are defined, and the difference between MCS levels is 4 to 5 dB. Herein, the CQI_feedback message is 5 bits and an average CQI is fed back in the best position-selection non-fair average CQI feedback scheme. Also, both the automatic error correction scheme and the BS broadcast message error correction scheme are used. The overhead of the non-fair average CQI feedback initialization process is neglected and a group_CQI_non-fair message is transmitted every 200 CQI feedbacks, for information updating. It is assumed that 1% of total group MSs leave the group every 10 CQI feedbacks and a representative MS does not leave the group. The overhead of each ACK message is 48 bits and a 10-bit overhead is generated from error correction in the BS broadcast message error correction scheme.

Referring to FIG. 15, a horizontal axis 1500 represents the number of MSs in the group and a vertical axis 1502 represents the amount of uplink overhead data.

It is noted from the graph that the uplink overhead increases in proportion to the number of MSs in the bus in an all-MS CQI feedback scheme. The best position-selection non-fair average CQI feedback decreases the uplink overhead to ⅕ or below, compared to the all-MS CQI feedback.

The use of the automatic error correction further decreases the uplink overhead, compared to the BS broadcast message error correction.

As is apparent from the above description, MSs within a preset range and having similar channel statuses are grouped into the same group and an average CQI is transmitted on a group basis in exemplary embodiments of the present invention. Also, an average CQI can be fed back on a spatially-correlated MS group basis.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Channel Quality Information (CQI) transmission method of a Mobile Station (MS) in a communication system, comprising:
receiving first information indicating a representative MS selected from a group of MSs including the MS, the group including MSs located within a preset range and in similar channel statuses;
determining from the first information whether the MS is designated as the representative MS; and
transmitting a CQI of the MS as a representative CQI of the MSs included in the group to a Base Station (BS), if the MS is designated as the representative MS.

2. The CQI transmission method of claim 1, wherein the representative MS is selected according to statuses of the MSs included in the group.

3. The CQI transmission method of claim 2, wherein the statuses of the MSs comprises at least one of channel statuses and power statuses.

4. The CQI transmission method of claim 1, wherein one of the MSs included in the group is sequentially designated as the representative MS during each of one or more time periods.

5. The CQI transmission method of claim 4, wherein the first information indicates a time when each of the MSs included in the group is designated as the representative MS.

6. The CQI transmission method of claim 1, if the MS is not designated as the representative MS, further comprising:
   receiving second information including a CQI of the representative MS from one of the BS and the representative MS;
   comparing the CQI of the representative MS with the CQI of the MS; and
   transmitting the CQI of the MS to the BS, if the difference between the CQIs exceeds a preset value.

7. The CQI transmission method of claim 1, further comprising:
   receiving third information indicating that a change has occurred to the group from the BS; and
   changing the group based on the third information.

8. The CQI transmission method of claim 7, wherein the change comprises at least one of one or more MSs joining the group and one or more MSs leaving the group.

9. A Channel Quality Information (CQI) reception method of a Base Station (BS) in a communication system, comprising:
   generating at least one group by grouping Mobile Stations (MSs) located within a preset range and in similar channel statuses into the same group;
   selecting a representative MS that will transmit a CQI from the group;
   generating first information indicating the representative MS;
   transmitting the first information to the MSs included in the group; and
   receiving a CQI of the representative MS from the representative MS in response to the first information.

10. The CQI reception method of claim 9, wherein the selection comprises selecting the representative MS according to statuses of the MSs included in the group.

11. The CQI reception method of claim 10, wherein the statuses of the MSs are at least one of channel statuses and power statuses.

12. The CQI reception method of claim 9, wherein the selection comprises selecting one of the MSs included in the group sequentially as the representative MS during each of one or more time periods.

13. The CQI reception method of claim 12, wherein the first information indicates a time when each of the MSs included in the group is designated as the representative MS.

14. The CQI reception method of claim 9, further comprising:
   generating second information including the CQI of the representative MS;
   transmitting the second information to remaining MSs included in the group other than the representative MS; and
   setting, upon receipt of a CQI of a first MS from the first MS in response to the second information, a Modulation and Coding Scheme (MCS) level corresponding to the CQI of the first MS to be applied to the first MS, wherein the first MS is one of the remaining MSs.

15. The CQI reception method of claim 9, further comprising:
   determining an MCS level corresponding to the CQI of the representative MS;
   setting the MCS level to be commonly applied to the MSs included in the group;
   calculating data error rates of the MSs included in the group;
   decreasing the MCS level of any MS having a data error rate higher than a target data error rate by one level; and
   increasing the MCS level of any MS having a data error rate lower than the target data error rate by one level.

16. The CQI reception method of claim 9, if a change has occurred to the group, further comprising:
   generating third information indicating that the change has occurred to the group; and
   transmitting the third information to at least one MS associated with the change in the group.

17. The CQI reception method of claim 16, wherein the change comprises at least one of one or more MSs joining the group and one or more MSs leaving the group.

18. A Channel Quality Information (CQI) transmission apparatus in a communication system, comprising:
   a Mobile Station (MS) for receiving first information indicating a representative MS selected from a group of MSs including the MS, the group including MSs located within a preset range and in similar channel statuses, for determining from the first information whether the MS is designated as the representative MS, and for transmitting a CQI of the MS as a representative CQI of the MSs included in the group to a Base Station (BS), if the MS is designated as the representative MS.

19. The CQI transmission apparatus of claim 18, wherein the representative MS is selected according to statuses of the MSs included in the group.

20. The CQI transmission apparatus of claim 19, wherein the statuses of the MSs comprises at least one of channel statuses and power statuses.

21. The CQI transmission apparatus of claim 18, wherein one of the MSs included in the group is sequentially designated as the representative MS during each of one or more time periods.

22. The CQI transmission apparatus of claim 21, wherein the first information indicates a time when each of the MSs included in the group is designated as the representative MS.

23. The CQI transmission apparatus of claim 18, wherein if the MS is not designated as the representative MS, the MS receives second information including a CQI of the representative MS from one of the BS and the representative MS, compares the CQI of the representative MS with the CQI of the MS, and transmits the CQI of the MS to the BS, if the difference between the CQIs exceeds a preset value.

24. The CQI transmission apparatus of claim 18, wherein the MS receives third information indicating that a change has occurred to the group from the BS, and changes the group based on the third information.

25. The CQI transmission apparatus of claim 24, wherein the change comprises at least one of one or more MSs joining the group and one or more MSs leaving the group.

26. A Channel Quality Information (CQI) reception apparatus in a communication system, comprising:
   a Base Station (BS) for generating at least one group by grouping Mobile Stations (MSs) located within a preset range and in similar channel statuses into the same group, for selecting a representative MS that will transmit a CQI from the group, for generating first information indicating the representative MS, for transmitting the first information to the MSs included in the group, and for receiving a CQI of the representative MS from the representative MS in response to the first information.

27. The CQI reception apparatus of claim 26, wherein the BS selects the representative MS according to statuses of the MSs included in the group.

28. The CQI reception apparatus of claim 27, wherein the statuses of the MSs are at least one of channel statuses and power statuses.

29. The CQI reception apparatus of claim 26, wherein the BS selects one of the MSs included in the group sequentially as the representative MS during each of one or more time periods.

30. The CQI reception apparatus of claim 29, wherein the first information indicates a time when each of the MSs included in the group is designated as the representative MS.

31. The CQI reception apparatus of claim 26, wherein the BS generates second information including the CQI of the representative MS, transmits the second information to remaining MSs included in the group other than the representative MS, and sets, upon receipt of a CQI of a first MS from the first MS in response to the second information, a Modulation and Coding Scheme (MCS) level corresponding to the CQI of the first MS to be applied to the first MS, wherein the first MS is one of the remaining MSs.

32. The CQI reception apparatus of claim 26, wherein the BS determines an MCS level corresponding to the CQI of the representative MS, sets the MCS level to be commonly applied to the MSs included in the group, calculates data error rates of the MSs included in the group, decreases the MCS level of any MS having a data error rate higher than a target data error rate by one level, and increases the MCS level of any MS having a data error rate lower than the target data error rate by one level.

33. The CQI reception apparatus of claim 26, wherein if a change has occurred to the group, the BS generates third information indicating that the change has occurred to the group, and transmits the third information to at least one MS associated with the change in the group.

34. The CQI reception apparatus of claim 33, wherein the change comprises at least one of one or more MSs joining the group and one or more MSs leaving the group.

35. A Channel Quality Information (CQI) transmission method of a Mobile Relay Station (MRS) in a communication system, comprising:
receiving first information requesting the MRS to transmit a CQI as a representative CQI of a group of MSs, the group including MSs located within a preset range and in similar channel statuses among MSs within a cell; and
transmitting the CQI of the MRS as the representative CQI of the MSs included in the group to a Base Station (BS) in response to the first information.

36. The CQI transmission method of claim 35, further comprising:
receiving second information including the CQI of the MRS from the BS; and
transmitting the second information to the MSs included in the group.

37. The CQI transmission method of claim 35, further comprising:
receiving third information indicating that a change has occurred to the group from the BS; and
transmitting the third information to at least one MS associated with the change in the group.

38. The CQI transmission method of claim 37, wherein the change comprises at least one of one or more MSs joining the group and one or more MSs leaving the group.

39. A Channel Quality Information (CQI) reception method of a Base Station (BS) in a communication system, comprising:
generating at least one group by grouping Mobile Stations (MSs) located within a preset range and in similar channel statuses among MSs within a cell into the same group;
generating first information requesting transmission of a representative CQI of the group;
transmitting the first information to a Mobile Relay Station (MRS); and
receiving a CQI of the MRS as the representative CQI of the MSs included in the group in response to the first information.

40. The CQI reception method of claim 39, further comprising:
generating second information including the CQI of the MRS;
transmitting the second information to the MSs included in the group; and
setting, upon receipt of a CQI of a first MS in response to the second information, a Modulation and Coding Scheme (MCS) level corresponding to the CQI of the first MS to be applied to the first MS, wherein the first MS is an MS included in the group.

41. The CQI reception method of claim 39, further comprising:
determining an MCS level corresponding to the CQI of the MRS;
setting the MCS level to be commonly applied to the MSs included in the group;
calculating data error rates of the MSs included in the group;
decreasing the MCS level of any MS having a data error rate higher than a target data error rate by one level; and
increasing the MCS level of any MS having a data error rate lower than the target data error rate by one level.

42. The CQI reception method of claim 39, if a change has occurred to the group, further comprising:
generating third information indicating that the change has occurred to the group; and
transmitting the third information to at least one MS associated with the change in the group.

43. The CQI reception method of claim 42, wherein the change comprises at least one of one or more MSs joining the group and one or more MSs leaving the group.

44. A Channel Quality Information (CQI) transmission apparatus in a communication system, comprising:
a Mobile Relay Station (MRS) for receiving first information requesting the MRS to transmit a CQI as a representative CQI of a group of MSs, the group including MSs located within a preset range and in similar channel statuses among MSs within a cell, and for transmitting the CQI of the MRS as the representative CQI of the MSs included in the group to a Base Station (BS) in response to the first information.

45. The CQI transmission apparatus of claim 44, wherein the MRS receives second information including the CQI of the MRS from the BS, and transmits the second information to the MSs included in the group.

46. The CQI transmission apparatus of claim 44, wherein the MRS receives third information indicating that a change has occurred to the group from the BS, and transmits the third information to at least one MS associated with the change in the group.

47. The CQI transmission apparatus of claim 46, wherein the change comprises at least one of one or more MSs joining the group and one or more MSs leaving the group.

48. A Channel Quality Information (CQI) reception apparatus in a communication system, comprising:
- a Base Station (BS) for generating at least one group by grouping Mobile Stations (MSs) located within a preset range and in similar channel statuses among MSs within a cell into the same group, generating first information requesting transmission of a representative CQI of the group, transmitting the first information to a Mobile Relay Station (MRS); and receiving a CQI of the MRS as the representative CQI of the MSs included in the group in response to the first information.

49. The CQI reception apparatus of claim 48, wherein the BS generates second information including the CQI of the MRS, transmits the second information to the MSs included in the group, and sets, upon receipt of a CQI of a first MS in response to the second information, a Modulation and Coding Scheme (MCS) level corresponding to the CQI of the first MS to be applied to the first MS, wherein the first MS is an MS included in the group.

50. The CQI reception apparatus of claim 48, wherein the BS determines an MCS level corresponding to the CQI of the MRS and sets the MCS level to be commonly applied to the MSs included in the group, calculates data error rates of the MSs included in the group, decreases the MCS level of any MS having a data error rate higher than a target data error rate by one level, and increases the MCS level of any MS having a data error rate lower than the target data error rate by one level.

51. The CQI reception apparatus of claim 48, wherein when a change has occurred to the group, the BS generates third information indicating that the change has occurred to the group, and transmits the third information to at least one MS associated with the change in the group.

52. The CQI reception apparatus of claim 51, wherein the change comprises at least one of one or more MSs joining the group and one or more MSs leaving the group.

* * * * *